United States Patent [19]

Gedeon et al.

[11] Patent Number: 5,326,130

[45] Date of Patent: * Jul. 5, 1994

[54] VEHICLE INSTRUMENT PANEL STRUCTURE

[75] Inventors: Dale G. Gedeon, Sterling Heights; David D. Segesta, Canton Township, Wayne County; Saad M. Abouzahr, Highland; Joseph J. Randazzo, Troy; Clifton Ditchfield, Madison Heights, all of Mich.

[73] Assignee: Chrysler Corporation, Highland Park, Mich.

[*] Notice: The portion of the term of this patent subsequent to Dec. 5, 2010 has been disclaimed.

[21] Appl. No.: 787,174

[22] Filed: Nov. 4, 1991

[51] Int. Cl.⁵ .......................................... B60R 21/045
[52] U.S. Cl. ...................................... 280/752; 180/90; 296/70
[58] Field of Search ................... 280/752, 748; 180/90; 296/70, 74, 901

[56] References Cited

U.S. PATENT DOCUMENTS

| | | | |
|---|---|---|---|
| 3,907,326 | 9/1975 | Arntson et al. | 180/90 |
| 4,491,362 | 1/1985 | Kennedy | 296/901 |
| 4,663,210 | 5/1987 | Schreiber et al. | 280/752 |
| 5,071,162 | 12/1991 | Takagawa | 280/752 |

FOREIGN PATENT DOCUMENTS 3803643  8/1989  Fed. Rep. of Germany ...... 280/751

Primary Examiner—Karin L. Tyson
Attorney, Agent, or Firm—Edward A. Craig

[57] ABSTRACT

A vehicle instrument panel structure is provided for extending transversely across the width of a vehicle interior forwardly of a vehicle occupant seat. The instrument panel structure includes an upstanding backing plate having a layer of foam material thereon covered by a decorative covering. The backing plate is a unitary member formed of a plastic material. A pair of spaced apart elongated horizontally extending box-like protuberances are provided on one portion of the lower section of the backing plate in the path of occupant knee travel which may occur during sudden deceleration of the vehicle.

3 Claims, 3 Drawing Sheets

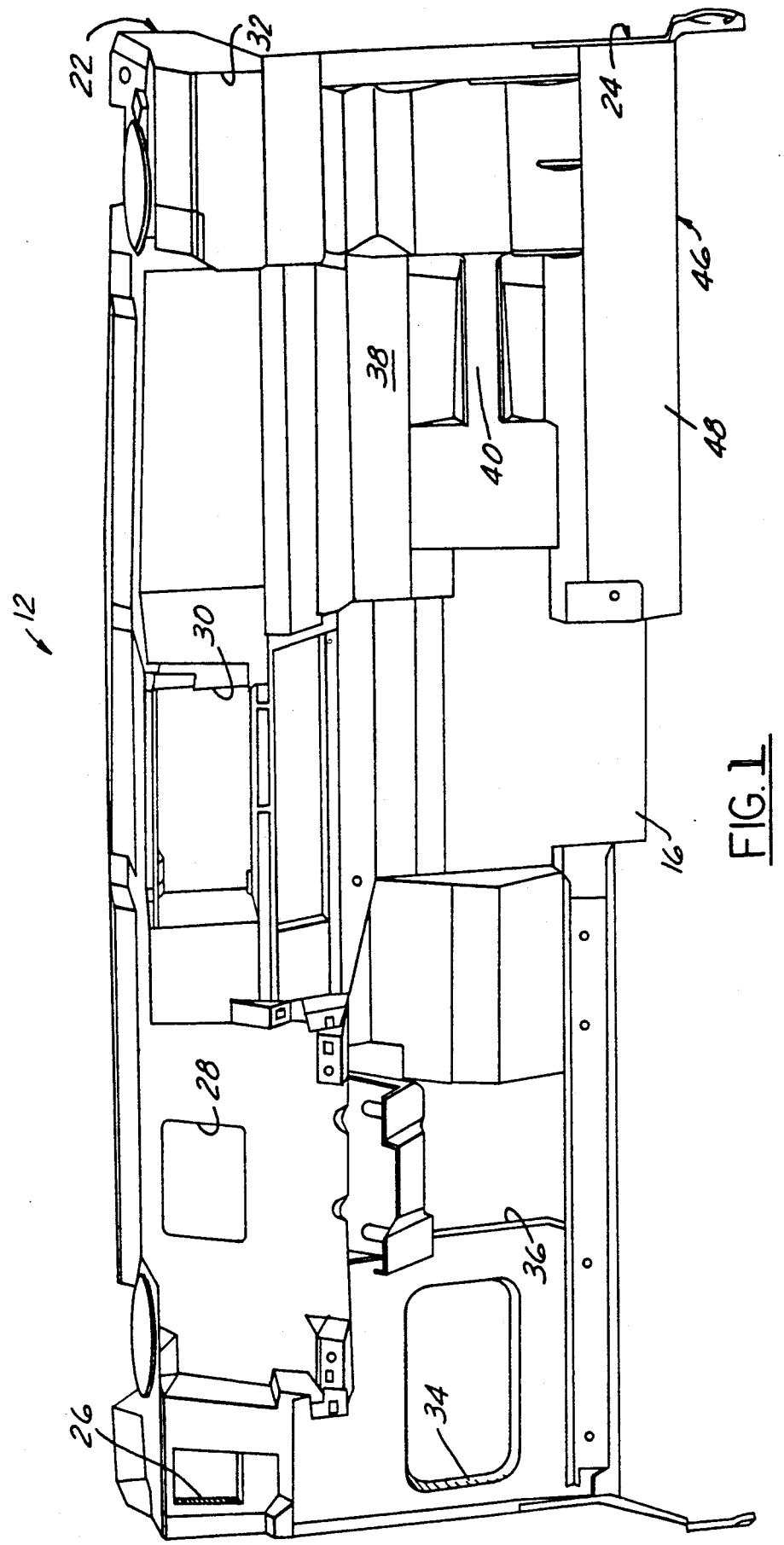

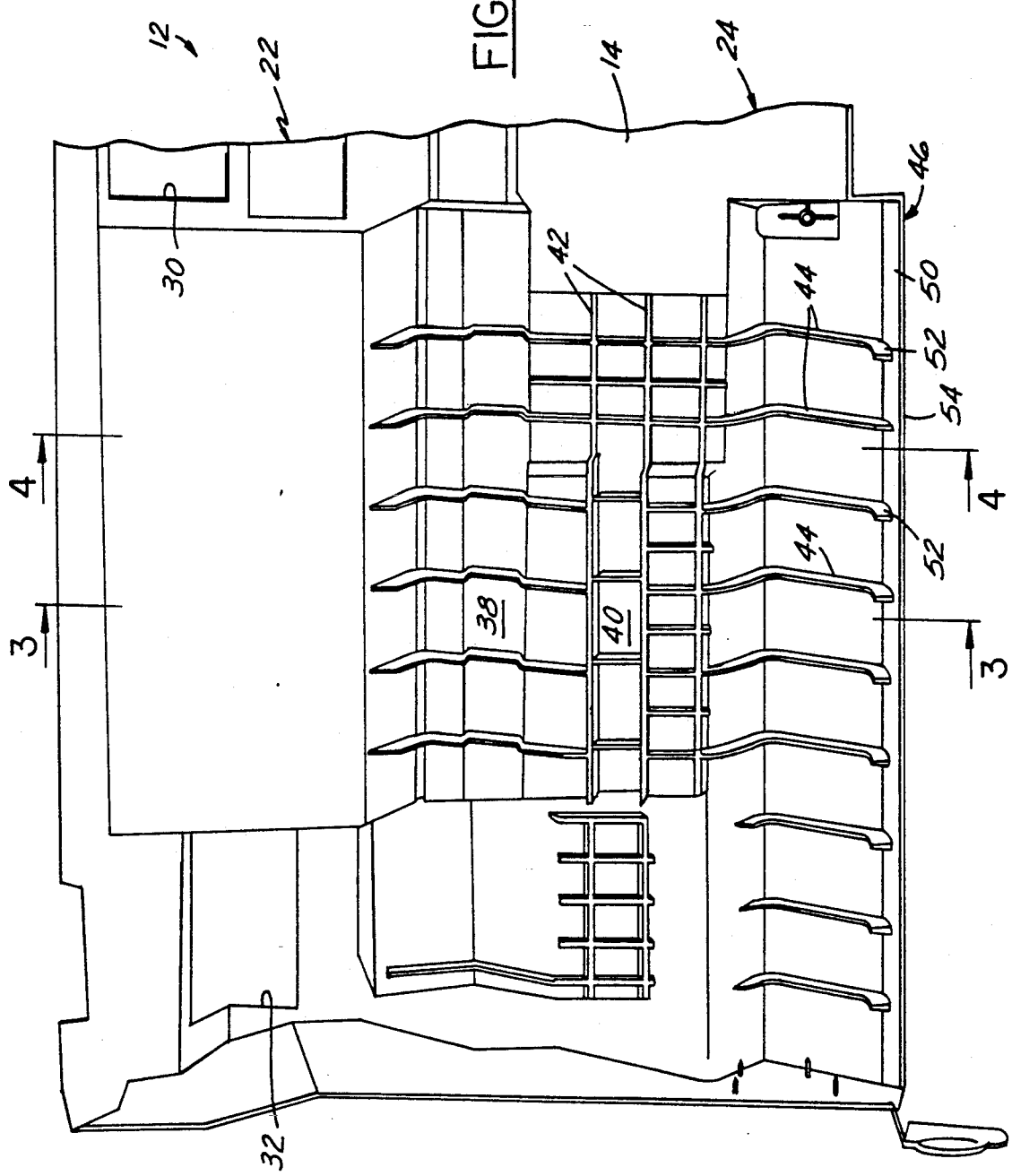

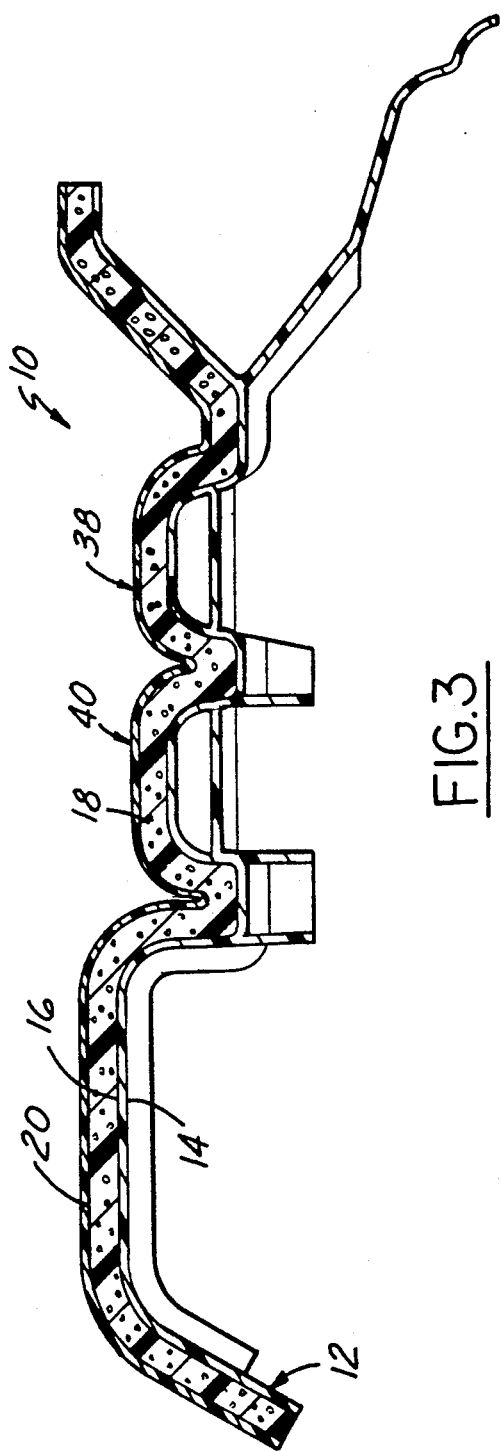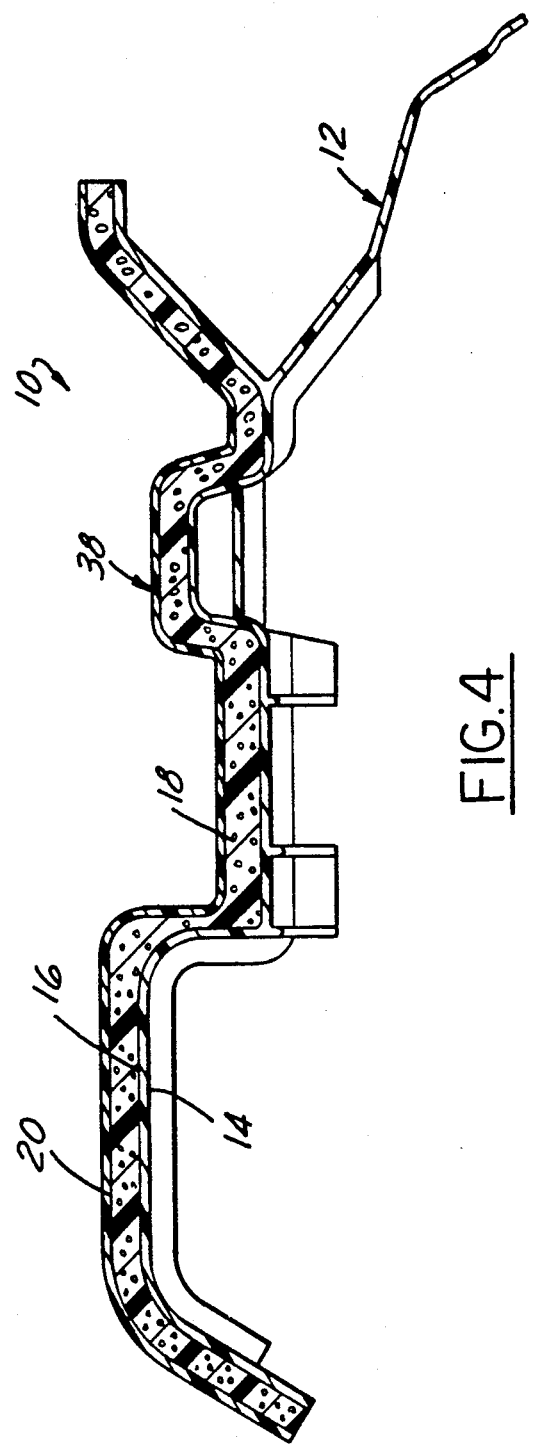

VEHICLE INSTRUMENT PANEL STRUCTURE

BACKGROUND OF THE INVENTION

1. Field of the Invention

This invention relates to a vehicle instrument panel structure which includes a backing plate comprising a unitary member formed of a plastic material.

2. Description of Related Art

Vehicle instrument panel structures of the type provided in the forward passenger compartment of modern vehicles serve a dual purpose. The upper portion of such instrument panel structures serve the traditional function of mounting the various meters, gauges, electronic equipment and control mechanisms. The lower portions of such instrument panel structures serve as occupant knee and ankle restraints, commonly referred to as "knee bolsters", to absorb the impact shock of knees and ankles which occurs upon sudden deceleration of the vehicle caused by a collision or high level braking.

Conventionally, vehicle instrument panels have been provided as layered structures including a sheet metal backing plate covered with a layer of shock absorbing foam material with an outer decorative vinyl covering thereover. An example of such a construction is shown in U.S. Pat. No. 3,907,326. The sheet metal backing plate has provided a stiff member which absorbs shock in accordance with the needs of energy absorbing characteristics which are desired. Sheet metal is satisfactory but does result in a relatively high cost and weight. The present invention provides a backing plate comprising a unitary member formed of a plastic material which results in reduced costs and weight.

SUMMARY OF THE INVENTION

A vehicle instrument panel structure is provided for extending transversely across the width of a vehicle interior forwardly of a vehicle occupant seat. The instrument panel structure comprises an upstanding backing plate having a forward face and a rearward face. A layer of foam material is provided on the rearward face of the backing panel. The layer of foam material has a decorative covering thereover.

The backing plate comprises a unitary member formed of a plastic material. The backing plate includes an upper portion and a lower portion. The lower portion functions as an occupant knee restraint. At least one transverse half of the lower portion includes at least two elongated vertically space apart horizontally extending hollow box-like protuberances centrally thereof positioned in the path of occupant knee travel which occurs upon sudden deceleration of a vehicle. The protuberances extend rearwardly from the rearward face of the backing plate. A plurality of spaced apart horizontally extending and spaced apart vertically extending ribs are provided on the forward face of the lower portion.

One of the protuberances is positioned above the other protuberance. The higher protuberance is longer than the lower protuberance and extends further towards the center of the backing plate.

A downwardly and forwardly extending lip having a rearward face and a forward face is provided on the bottom of the transverse half of the lower portion of the backing plate. The lip functions as an occupant ankle restraint. A plurality of horizontally spaced apart vertically extending ribs are provided on the forward face of the lip. These ribs terminate short of the lower edge of the lip.

One transverse half of the backing plate is designated as the driver's side and the other transverse half of backing plate is designated as the passenger side. The transverse half of the lower portion having protuberances thereon forms part of the passenger side of the backing plate.

IN THE DRAWINGS

FIG. 1 is an elevational view of a backing plate in accordance with one embodiment of the present invention illustrating the rearward face thereof;

FIG. 2 is a partial elevational view of the backing plate of FIG. 1 illustrating the forward face thereof;

FIG. 3 is a sectional view taken substantially along the line 3—3 of FIG. 2 looking in the direction of the arrows with a layer of foam covered by a decorative cover added to the rearward face of the backing plate; and FIG. 4 is a sectional view taken substantially the line 4—4 of FIG. 2 looking in the direction of the arrows also with a layer of foam covered by a decorative cover added to the rearward face thereof.

Referring to the figures, a vehicle instrument panel structure 10, shown in FIGS. 3 and 4, is provided for extending transversely across the width of a vehicle interior forwardly of a vehicle occupant seat. The instrument panel structure 10 is provided forwardly of the front seat of a car or truck. The instrument panel structure comprises an upstanding backing plate 12 having a forward face 14 and a rearward face 16. A layer of foam material 18 is provided on the rearward face 16 of the backing plate 12. The foam material may be, for example, an energy absorbing urethane foam. A decorative covering 20 is provided over the layer of foam 18. The decorative covering 20 may be fabricated of, for example, vinyl.

The backing plate 12 comprises a unitary member formed of a plastic material, for example, it may be injection molded of a polycarbonate. The backing plate includes an upper portion 22 and a lower portion 24. The upper portion 22 functions as a mounting structure for various instrument panel components such as meters, gauges, electronic equipment, and control mechanisms. Representatively, apertures 26, 28, 30, 32 are provided for this purpose.

As seen in FIG. 1, the left side the backing plate 12 is designated as the driver's side and the right side is designated as the passenger side. These positions could, of course, be reversed for a right-hand drive vehicle. As will be noted, two relatively large apertures 34, 36 are provided on the driver's side of the backing plate 12. The aperture 34 is for a fuse box and the aperture 36 is provided for passage of the steering column. The sizes of these apertures makes it necessary to provide sheet metal reinforcing on the driver's side of the instrument panel 12 illustrated. However, such aperture design features could be eliminated and the driver's side of the backing plate 12 could be designed in the manner set forth in connection with the passenger side as will be hereinafter described.

The lower portion 24 functions as an occupant knee restraint. At least one transverse half of the lower portion 24, namely the passenger side half, includes at least two elongated vertically spaced apart horizontally extending hollow box-like protuberances 38, 40 positioned centrally thereof in a location in the path of occupant knee travel occurring upon sudden deceleration of a vehicle. Such deceleration may be caused by an accident or hard braking. The protuberances 38, 40 extend rearwardly from the rearward face 16 of the backing plate. In one embodiment, the longer protuberance 38 was about 18½ inches long and the shorter protuberance 40 was about 17½ inches long. The wall thickness of the backing plate was about ⅛ of an inch. The protuberances were each about one-half inch deep and 1¼ inches wide and were spaced apart a distance of about 1¾ inches. The longer protuberance 38 is positioned above the shorter protuberance 40 and extends further towards the center of the backing plate 12.

A plurality of spaced apart horizontally extending ribs 42 and a plurality of spaced apart vertically extending ribs 44 are provided on the forward face 14 of the lower portion 24. It will be appreciated that the term "forward" means towards the front of the vehicle and term "rearward" means towards the rear of the vehicle. The ribs 42, 44 serve a reinforcing function as do the protuberances 38, 40.

A downwardly and forwardly extending lip 46 having a rearward face 48 and a forward face 50 is provided on the bottom of the passenger side transverse half of the lower portion 24. The lip 46 functions as an occupant ankle restraint. A plurality of horizontally spaced apart vertically extending rib portions 52 are provided on the forward face 50 of the lip 52. The rib portions 52 terminate short of the lower edge 54 of the lip. Terminating the ribs 52 short of the lower edge 54 of the lip results in minimizing the possibility of stress fractures of the lip 46.

We claim:

1. A vehicle instrument panel structure for extending transversely across the width of a vehicle interior forwardly of a vehicle occupant seat, the instrument panel structure comprising an upstanding backing plate having a forward face and a rearward face, a layer of foam material on the rearward face of the backing plate, the layer of foam material having a decorative covering thereover, the backing plate comprising a unitary member formed of a plastic material, the backing plate including an upper portion and a lower portion positioned in the path of occupant knee travel occurring upon sudden deceleration of a vehicle, the lower portion functioning as an occupant knee restraint, at least one transverse half of the lower portion including at least two elongated vertically spaced apart horizontally extending hollow rectangularly shaped protuberances centrally thereof positioned in the path of occupant knee travel occurring upon sudden deceleration of a vehicle, the protuberances extending rearwardly from the rearward face of the backing plate, a plurality of spaced apart horizontally extending and spaced apart vertically extending ribs on the forward face of the lower portion, a downwardly and forwardly extending lip having a rearward face and a forward face provided on the bottom of said transverse half of said lower portion, said lip functioning as an occupant ankle restraint, and a plurality of horizontally spaced apart vertically extending ribs on the forward face of the lip, said last mentioned ribs terminating short of the lower edge of the lip.

2. A vehicle instrument panel structure as defined in claim 1, wherein one of the protuberances is positioned above the other protuberance, said one protuberance being longer than said other protuberance and extending further towards a center of the backing plate, said protuberances being at least one inch wide, one half inch deep, and between seventeen and nineteen inches long.

3. A vehicle instrument panel structure as defined in claim 1, wherein on transverse half of the backing plate is designated as the driver's side and the other transverse half of the backing plate is designated as the passenger side, said one transverse half of the lower portion forming part of the passenger side of the backing plate, the driver's side of the backing plate having a plurality of relatively large apertures, sheet metal reinforcing being provided on the driver's side of the backing plate.

* * * * *